(12) United States Patent
Hino

(10) Patent No.: US 8,357,451 B2
(45) Date of Patent: Jan. 22, 2013

(54) LAMINATED GLASS, AND METHOD FOR PRODUCING SAME

(75) Inventor: Yuichi Hino, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/531,855

(22) Filed: Jun. 25, 2012

(65) Prior Publication Data

US 2012/0276374 A1    Nov. 1, 2012

Related U.S. Application Data

(63) Continuation of application No. PCT/JP2010/072938, filed on Dec. 20, 2010.

(30) Foreign Application Priority Data

Dec. 24, 2009 (JP) ................................ 2009-292007

(51) Int. Cl.
*C03C 27/12* (2006.01)
*B32B 17/10* (2006.01)

(52) U.S. Cl. ........ 428/332; 156/103; 156/106; 428/336; 428/436; 428/437

(58) Field of Classification Search .................. 156/103, 156/106; 428/332, 336, 436, 437
See application file for complete search history.

(56) References Cited

U.S. PATENT DOCUMENTS 4,465,736 A    8/1984  Nishihara et al. ............. 428/332
6,797,396 B1*  9/2004  Liu et al. ...................... 428/483
2010/0215952 A1  8/2010  Takamatsu et al. ........... 428/339

FOREIGN PATENT DOCUMENTS

| JP | 58-067441 | 4/1983 |
| JP | 59-081161 | 5/1984 |
| JP | 60-225747 | 11/1985 |
| JP | 2009-035438 | 2/2009 |
| WO | WO 2011/055685 | 5/2011 |

OTHER PUBLICATIONS

International Search Report issued Feb. 22, 2011 in PCT/JP2010/072938 filed Dec. 20, 2010.

* cited by examiner

*Primary Examiner* — D. S. Nakarani
(74) *Attorney, Agent, or Firm* — Oblon, Spivak, McClelland, Maier & Neustadt, L.L.P.

(57) ABSTRACT

The present invention relates to a laminated glass including a first glass substrate, a first adhesive layer, a heat reflective film, a second adhesive layer and a second glass substrate, laminated in this order, in which the heat reflective film includes a resin film having specific thermal shrinkages in a direction that a thermal shrinkage becomes maximum and in a direction orthogonal to the direction, and a heat reflective coating formed on the resin film; the first adhesive layer and the second adhesive layer include a polyvinyl butyral film having thermal shrinkages in a direction that a thermal shrinkage becomes maximum and in a direction orthogonal to the direction; and the direction that a thermal shrinkage becomes maximum, of the resin film and the direction that a thermal shrinkage becomes maximum, of the polyvinyl butyral film are orthogonal to each other.

11 Claims, 2 Drawing Sheets

LAMINATED GLASS, AND METHOD FOR PRODUCING SAME

TECHNICAL FIELD

The present invention relates to a laminated glass with a heat reflective film and a method for manufacturing the same, and particularly relates to a laminated glass in which wrinkles, deformation and the like in the heat reflective film are suppressed, and a method for manufacturing the same.

BACKGROUND ART

A laminated glass obtained by laminating a pair of glass substrates through a heat reflective film sandwiched between a pair of adhesive layers has conventionally been known as a laminated glass used in a wind shield of vehicles and the like. Such a laminated glass is manufactured by, for example, overlaying a glass substrate, an adhesive film, a heat reflective film, an adhesive film and a glass substrate in this order, cutting the adhesive films and the heat reflective film protruding from the edge of a pair of glass substrates to remove the protruded part, and heating and pressuring the whole to integrate.

The heat reflective film is a film obtained by alternately laminating an oxide layer and a metal layer on, for example, a polyester film produced by a drawing process. However, in a resin film produced by a drawing process, stress by drawing is present as residual stress. The residual stress causes thermal shrinkage by heating and pressurization in manufacturing a laminated glass, thereby generating wrinkles and the like in a heat reflective film containing the resin film.

As a means to suppress generation of wrinkles and the like in a heat reflective film, a means that thermal shrinkage of a resin film constituting a base material in a heat reflective film is set to a specific range is known (for example, see Patent Document 1).

BACKGROUND ART DOCUMENTS

Patent Document
  Patent Document 1: JP-A 2009-35438

SUMMARY OF THE INVENTION

Problems that the Invention is to Solve

As a means to suppress generation of wrinkles and the like in a heat reflective film, it is known to use a resin film having specific thermal shrinkage in its base material. However, anisotropy is present in thermal shrinkage of a resin film, and anisotropy is also present in thermal shrinkage of an adhesive film. Therefore, merely controlling thermal shrinkage of a resin film cannot sufficiently suppress generation of wrinkles, deformation and the like in a heat reflective film.

The present invention has been made to solve the above problems, and has an object to provide a laminated glass in which generation of wrinkles, deformation and the like in a heat reflective film is suppressed. Furthermore, the present invention has an object to provide a method for manufacturing a laminated glass in which generation of wrinkles, deformation and the like in a heat reflective film is suppressed.

Means for Solving the Problems

A laminated glass of the invention comprises a first glass substrate, a first adhesive layer, a heat reflective film, a second adhesive layer and a second glass substrate, laminated in this order, wherein the heat reflective film comprises a resin film having a thermal shrinkage in a direction that a thermal shrinkage becomes maximum, of 0.5% or more and 3% or less and a thermal shrinkage in a direction orthogonal to the direction of 0.1% or more and 2% or less, and a heat reflective coating formed on the resin film;

the first adhesive layer and the second adhesive layer comprise a polyvinyl butyral film having a thermal shrinkage in a direction that a thermal shrinkage becomes maximum, of 0.5% or more and 3% or less and a thermal shrinkage in a direction orthogonal to the direction of −2.5% or more and −0.5% or less; and the direction that a thermal shrinkage becomes maximum, of the resin film and the direction that a thermal shrinkage becomes maximum, of the polyvinyl butyral film are orthogonal to each other;

provided that the thermal shrinkage of the resin film is a thermal shrinkage when the resin film is maintained at 150° C. for 30 minutes, and the thermal shrinkage of the polyvinyl butyral film is a thermal shrinkage when the polyvinyl butyral film is maintained at 60° C. for 30 minutes.

A method for manufacturing a laminated glass of the invention, comprises:

an intermediate production step of overlaying first and second polyvinyl butyral films on both surfaces of a heat reflective film, followed by heating and pressuring, thereby obtaining an intermediate; and a pressing step of overlaying first and second glass substrates on both surfaces of the intermediate, followed by heating and pressuring, thereby obtaining a laminated glass, wherein the heat reflective film comprises a resin film having a thermal shrinkage in a direction that a thermal shrinkage becomes maximum, of 0.5% or more and 3% or less and a thermal shrinkage in a direction orthogonal to the direction of 0.1% or more and 2% or less, and a heat reflective coating formed on the resin film;

the first and second polyvinyl butyral films have a thermal shrinkage in a direction that a thermal shrinkage becomes maximum, of 0.5% or more and 3% or less and a thermal shrinkage in a direction orthogonal to the direction of −2.5% or more and −0.5% or less; and in the intermediate production step, the heat reflective film and the first and second polyvinyl butyral films are overlaid such that the direction that a thermal shrinkage becomes maximum, of the resin film and the direction that a thermal shrinkage becomes maximum, of the first and second polyvinyl butyral films are orthogonal to each other;

provided that the thermal shrinkage of the resin film is a thermal shrinkage when the resin film is maintained at 150° C. for 30 minutes, and the thermal shrinkage of the polyvinyl butyral film is a thermal shrinkage when the polyvinyl butyral film is maintained at 60° C. for 30 minutes.

Another method for manufacturing a laminated glass of the invention, comprises:

a lamination step of overlaying a first glass substrate, a first polyvinyl butyral film, a heat reflective film, a second polyvinyl butyral film and a second glass substrate in this order to obtain an unpressed laminated glass; and a pressing step of heating and pressuring the unpressed laminated glass to obtain a laminated glass;

wherein the heat reflective film comprises a resin film having a thermal shrinkage in a direction that a thermal shrinkage becomes maximum, of 0.5% or more and 3% or less and a thermal shrinkage in a direction orthogonal to the direction of 0.1% or more and 2% or less, and a heat reflective coating formed on the resin film;

the first and second polyvinyl butyral films have a thermal shrinkage in a direction that a thermal shrinkage becomes maximum, of 0.5% or more and 3% or less and a thermal shrinkage in a direction orthogonal to the direction of −2.5% or more and −0.5% or less; and in the lamination step, the heat reflective film and the first and second polyvinyl butyral films are overlaid such that the direction that a thermal shrinkage becomes maximum, of the resin film and the direction that a thermal shrinkage becomes maximum, of the first and second polyvinyl butyral films are orthogonal to each other;

provided that the thermal shrinkage of the resin film is a thermal shrinkage when the resin film is maintained at 150° C. for 30 minutes, and the thermal shrinkage of the polyvinyl butyral film is a thermal shrinkage when the polyvinyl butyral film is maintained at 60° C. for 30 minutes.

ADVANTAGE OF THE INVENTION

According to the laminated glass of the present invention, generation of wrinkles, deformation and the like in a heat reflective film can be suppressed by arranging a resin film having thermal shrinkages in a direction that a thermal shrinkage becomes maximum and in a direction orthogonal to the direction, that fall within specific ranges, and a polyvinyl butyral film such that the directions that the respective thermal shrinkages become maximum are orthogonal to each other.

According to the method for manufacturing a laminated glass of the present invention, a laminated glass in which generation of wrinkles, deformation and the like in a heat reflective film is suppressed can be manufactured by arranging a resin film having thermal shrinkages in a direction that a thermal shrinkage becomes maximum and in a direction orthogonal to the direction, that fall within specific ranges, and a polyvinyl butyral film such that the directions that the respective thermal shrinkages become maximum are orthogonal to each other.

MODE FOR CARRYING OUT THE INVENTION

The present invention is described below by reference to the drawings.

Figure 1:
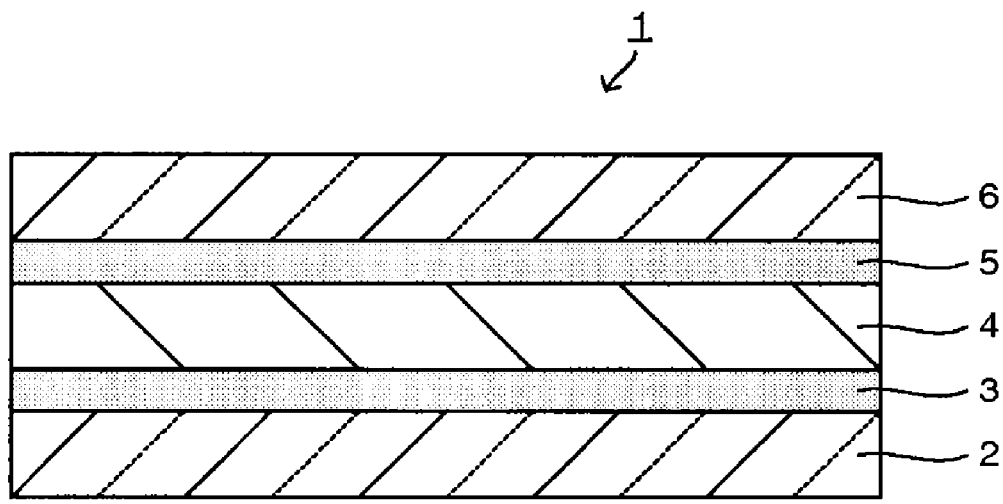
FIG. 1 is a cross-sectional view showing one example of a laminated glass of the present invention.

FIG. 1 is a cross-sectional view showing one example of a laminated glass 1 of the present invention. The laminated glass 1 of the present invention includes a first glass substrate 2, a first adhesive layer 3, a heat reflective film 4, a second adhesive layer 5 and a second glass substrate 6, laminated in this order.

Figure 2:
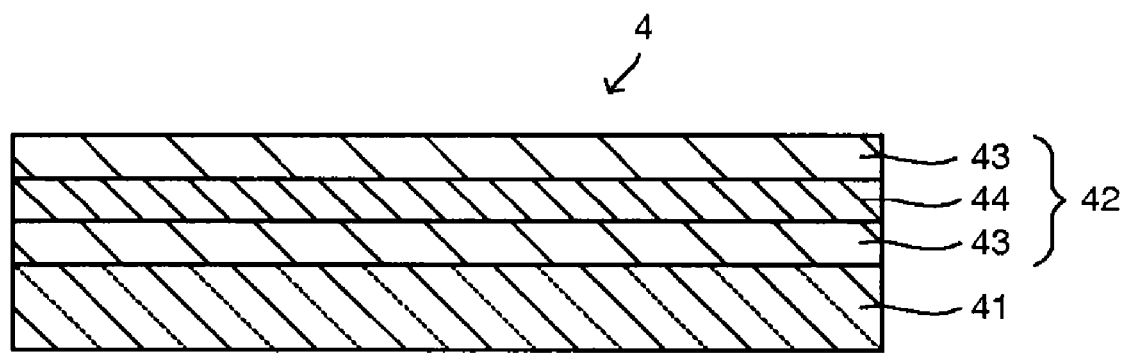
FIG. 2 is a cross-sectional view showing one example of a heat reflective film shown in FIG. 1.

The first and second adhesive layers 3 and 5 include a polyvinyl butyral film (hereinafter referred to as a "PVB film"). The heat reflective film 4 includes a resin film 41 constituting a base material and a heat reflective coating 42 formed thereon as shown in FIG. 2. The heat reflective coating 42 includes, for example, an oxide layer 43 and a metal layer 44, alternately laminated in total (2n+1) layers (wherein n is an integer of from 1 to 4). The heat reflective coating shown in FIG. 2 shows the embodiment of n=1, that is, the total number of layers of the oxide layer 43 and the metal layer 44 is 3. Although not shown, a protective layer may be formed on the heat reflective coating 42.

In the laminated glass 1 of the present invention, a thermal shrinkage in a direction that a thermal shrinkage becomes maximum, of the resin film 41 is 0.5% or more and 3% or less, a thermal shrinkage in a direction orthogonal to the direction is 0.1% or more and 2% or less, and additionally, a thermal shrinkage in a direction that a thermal shrinkage becomes maximum, of the PVB film is 0.5% or more and 3% or less, and a thermal shrinkage in a direction orthogonal to the direction is −2.5% or more and −0.5% or less. The thermal shrinkage of the resin film 41 is a thermal shrinkage when the film is maintained at 150° C. for 30 minutes, and the thermal shrinkage of the PVB film is a thermal shrinkage when the film is maintained at 60° C. for 30 minutes (hereinafter the same).

In the laminated glass 1, the direction that a thermal shrinkage becomes maximum, of the resin film 41 and the direction that a thermal shrinkage becomes maximum, of the PVB film constituting the first and second adhesive layers 3 and 5 are orthogonal to each other. Hereinafter, a direction that a thermal shrinkage becomes maximum is referred to as a "maximum shrinkage direction", and a direction orthogonal to the direction is referred to as an "orthogonal direction".

The resin film 41 constituting a base material of the heat reflective film 4 and the PVB film constituting the first and second adhesive layers 3 and 5 are generally produced by drawing those constituent materials in a film shape. However, in the film produced by drawing, stress by drawing is present as residual stress. The residual stress causes thermal shrinkage by heating and pressuring when producing a laminated glass, and generates wrinkles, deformation and the like in the heat reflective film 4 containing the residual stress. In particular, thermal shrinkage easily occurs in a film formation direction which is a main drawing direction, that is, MD direction, thereby easily causing wrinkles, deformation and the like in the heat reflective film 4.

Furthermore, the resin film 41 and the PVB film are generally moved and processed in a constant direction while maintaining a direction such as a film formation direction, and those films are overlaid in its state to form a laminated film. Therefore, those films are apt to be overlaid in a state that the film formation direction, that is, the maximum shrinkage direction, of the resin film 41 consists with that of the PVB film, resulting in easily generating wrinkles, deformation and the like in the heat reflective film 4.

According to the present invention, generation of wrinkles, deformation and the like in the heat reflective film 4 can be suppressed by arranging the resin film 41 and the PVB film such that their maximum shrinkage directions are orthogonal to each other, thereby making the mutual maximum shrinkage directions different. In particular, in the PVB film, a thermal shrinkage in an orthogonal direction, for example, a direction orthogonal to the film formation direction, that is, TD direction, becomes negative, and the PVB film easily thermally expands. In view of this fact, by conforming the orthogonal direction of the PVB film to the maximum shrinkage direction of the resin film 41, thermal shrinkage of the resin film 41 is positively suppressed, and this can suppress generation of wrinkles, deformation and the like in the heat reflective film 4.

It is preferred that the maximum thermal shrinkage direction of the resin film 41 is completely orthogonal to that of the individual PVB films. However, it is sufficient if deviation of an angle of the individual PVB films from the completely orthogonal state is within ±5°. When the deviation of an angle of individual PVB films is within ±5°, the thermal shrinkage of the resin film 41 can appropriately be corrected by thermal expansion of the PVB film, and generation of wrinkles, deformation and the like in the heat reflective film 4 can be suppressed.

In the present invention, the first and second adhesive layers 3 and 5 include a PVB film for the reason that balance in various performances such as transparency, weatherability, strength, adhesive force, penetrability, impact energy absorbability, moisture resistance, heat shieldability, sound insulating properties and the like is further excellent. The PVB film is generally that a film formation direction is the maximum shrinkage direction, a thermal shrinkage in the film formation direction is 0.5% or more and 3% or less, and a thermal shrinkage in a direction orthogonal to the film formation direction is −2.5% or more and −0.5% or less. The thermal shrinkage in a direction that a thermal shrinkage becomes maximum, of the PVB film is preferably 1.5% or more and 2.5% or less, and more preferably 1.8% or more and 2.4% or less. The thermal shrinkage in a direction orthogonal to the direction that a thermal shrinkage becomes maximum, of the PVB film is preferably −2.0% or more and −0.7% or less, and more preferably −1.5% or more and −0.9% or less.

Since the thermal shrinkage in an orthogonal direction of the PVB film is −2.5% or more and −0.5% or less, that is, the PVB film thermally expands to a certain extent, the thermal shrinkage of the resin film 41 is positively suppressed by conforming the orthogonal direction to the maximum shrinkage direction of the resin film 41, whereby generation of wrinkles, deformation and the like in the heat reflective film 4 can be suppressed.

On the other hand, the thermal shrinkage in the maximum shrinkage direction of the resin film 41 is 0.5% or more and 3% or less, and the thermal shrinkage in an orthogonal direction is 0.1% or more and 2% or less. In the case where the thermal shrinkage in the maximum shrinkage direction is less than 0.5% or the thermal shrinkage in an orthogonal direction is less than 0.1%, thermal shrinkage is not sufficient when the resin film 41 is used together with the PVB film, and when the first and second glass substrates 2 and 6 are curved, the resin film 41 may not appropriately bring into close contact with the curve. The thermal shrinkage in a direction that the thermal shrinkage becomes maximum, of the resin film 41 is preferably 0.5% or more and 1.5% or less, and more preferably 0.7% or more and 1.3% or less. The thermal shrinkage in a direction orthogonal to the direction that the thermal shrinkage becomes maximum, of the resin film 41 is preferably 0.1% or more and 1% or less, and more preferably 0.2% or more and 0.6% or less.

In the case where the thermal shrinkage in the maximum shrinkage direction of the resin film 41 exceeds 3%, or in the case where the thermal shrinkage in the orthogonal direction exceeds 2%, the thermal shrinkage becomes excessively large even though used together with the PVB film, and wrinkles, deformation and the like may be generated in the heat reflective film 4.

More preferred combination of the thermal shrinkages is, for example, that the thermal shrinkage in a direction that a thermal shrinkage becomes maximum, of the resin film 41 is 0.5% or more and 1.5% or less, the thermal shrinkage in a direction orthogonal to the direction is 0.1% or more and 1% or less, the thermal shrinkage in a direction that a thermal shrinkage becomes maximum, of the PVB film is 1.5% or more and 2.5% or less, and the thermal shrinkage in a direction orthogonal to the direction is −1.5% or more and −0.5% or less.

The thermal shrinkage of the resin film 41 is a thermal shrinkage when maintained at 150° C. for 30 minutes as described above, and the thermal shrinkage of the PVB film is a thermal shrinkage when maintained at 60° C. for 30 minutes. Heat treatment for measuring the thermal shrinkage of each film is conducted in a state of floating suspended in a heating oven (unloaded state). The thermal shrinkage is calculated by the following formula (1) when length before heat treatment is $L_1$ and length after heat treatment is $L_2$. The lengths $L_1$ and $L_2$ are lengths in the maximum shrinkage direction or the orthogonal direction of the resin film 41 or the PVB film.

$$\text{Thermal shrinkage} = ((L_1 - L_2)/L_i) \times 100\ [\%] \tag{1}$$

Specifically, the thermal shrinkage can be obtained as follows.

Figure 3:
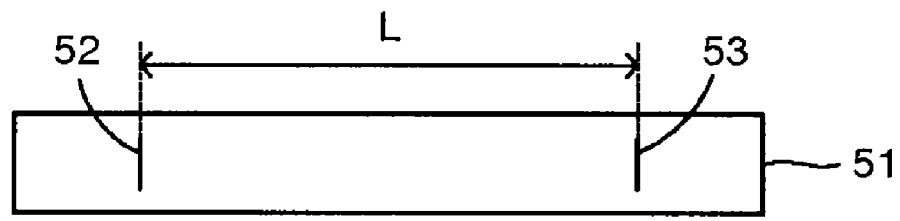
FIG. 3 is an explanatory view showing a measurement method of thermal shrinkage of a resin film.

Regarding the thermal shrinkage of the resin film 41, a strip test piece 51 as shown in FIG. 3 is cut out along a maximum shrinkage direction or an orthogonal direction of the resin film 41. The test piece 51 has, for example, a length of 150 mm and a width of 20 mm. A pair of reference lines 52 and 53 is marked on the test piece 51 in a longitudinal direction with an interval of about 100 mm, and a length L between the reference lines 52 and 53 is measured. The length L corresponds to $L_1$ in the above formula (1).

The test piece 51 is vertically hung in a circulating hot air oven. The temperature is increased to 150° C., the test piece 51 is held for 30 minutes, the temperature is naturally cooled to room temperature, the test piece 51 is held for 60 minutes, and the length L is again measured. The length L corresponds to $L_2$ in the above formula (1). The thermal shrinkage can be calculated by substituting the length Ls ($L_1$ and $L_2$) obtained in the formula (1).

In general, a film formation direction corresponds to a maximum shrinkage direction. Therefore, if the film formation direction is previously known, the thermal shrinkage obtained in the film formation direction can be thermal shrinkage in the maximum shrinkage direction, and for the same reason, the thermal shrinkage obtained in a direction orthogonal to the film formation direction can be a thermal shrinkage in the orthogonal direction.

Figure 4:
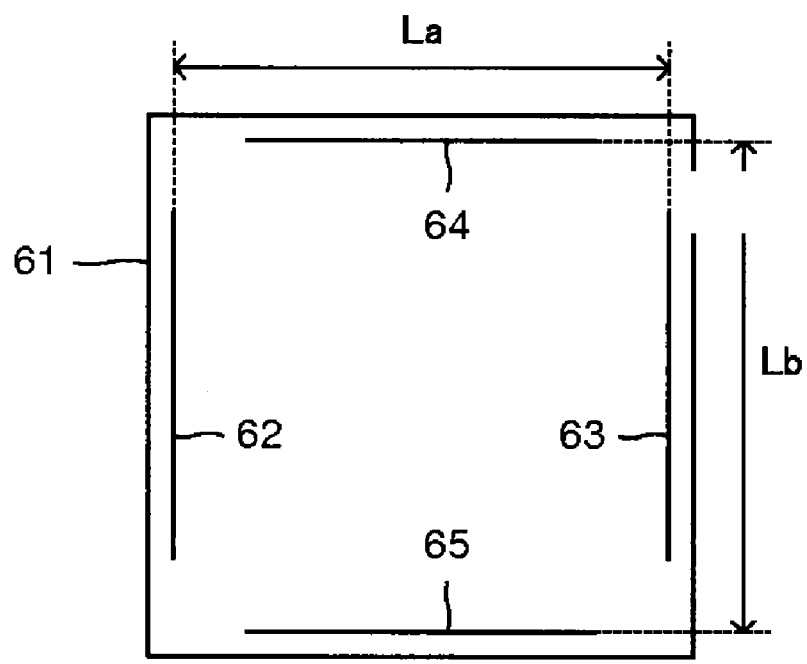
FIG. 4 is an explanatory view showing a measurement method of thermal shrinkage of a polyvinyl butyral film.

On the other hand, regarding the thermal shrinkage of the PVB film, a rectangular test piece 61 as shown in FIG. 4 is cut out of a PVB film. In this case, a pair of facing sides conforms with the maximum shrinkage direction, and other pair of facing sides conforms with the orthogonal direction. The test piece 61 has a size of, for example, 110 mm×110 mm. A pair of reference lines 62 and 63 is marked between a pair of facing sides at intervals of about 100 mm, and length La between the reference lines 62 and 63 is measured. A pair of reference lines 64 and 65 is marked between the other facing sides at intervals of about 100 mm, and length Lb between the reference lines 64 and 65 is measured. The length La and Lb in this case correspond to $L_1$ in the above formula (1), respectively.

The test piece 61 is placed on a glass plate in a circulating hot air oven, temperature is increased to 60° C., the test piece 61 is maintained for 30 minutes, naturally cooled to room temperature and maintained for 60 minutes, and lengths La and Lb are measured. The lengths La and Lb in this case correspond to $L_2$ in the above formula (1), respectively. Thermal shrinkage can be calculated by substituting the lengths La ($L_1$ and $L_2$) and Lb ($L_1$ and $L_2$) obtained in the respective directions individually in the above formula (1).

Regarding the PVB film, a film formation direction generally corresponds to a maximum shrinkage direction. Therefore, if the film formation direction is previously known, the thermal shrinkage obtained in the film formation direction can be a thermal shrinkage in the maximum shrinkage direction, and for the same reason, the thermal shrinkage obtained in a direction orthogonal to the film formation direction can be a thermal shrinkage in the orthogonal direction.

The resin film 41 is not particularly limited so long as a thermal shrinkage in each direction falls within a given range, and the film can include polycarbonate, polymethyl methacrylate (PMMA), polyethylene terephthalate (PET), polyethylene naphthalate (PEN), polyimide, polyether sulfone, polyarylate, nylon, cycloolefin polymer or the like.

A film including polyethylene terephthalate (PET) is generally used from the standpoints that the film has relatively high strength and can suppress damages when manufacturing the laminated glass 1. The thickness of the resin film 41 is not always limited, but is preferably 5 μm or more and 200 μm or less, more preferably 20 μm or more and 100 μm or less, and most preferably 40 μm or more and 60 μm or less.

The PVB film is not particularly limited so long as thermal shrinkage in each direction falls within a given range. However, a film having a thickness of 50 μm or more and 1,000 μm or less is generally used, and a film having a thickness of 500 μm or more and 900 μm or less is preferably used. In the adhesive layers 3 and 5, a material of the PVB film may be the same or different.

The oxide layer 43 in the heat reflective coating 42 has a refractive index of generally 1.7 or more and 2.6 or less, and particularly 1.8 or more and 2.6 or less. A layer including a metal oxide such as bismuth oxide, tin oxide, zinc oxide, tantalum oxide, niobium oxide, tungsten oxide, titanium oxide, zirconium oxide or indium oxide, as a main component, or a layer containing those mixtures is preferably used. In particular, a layer including zinc oxide as a main component, or a layer including indium oxide as a main component is preferably used. The layer including zinc oxide as a main component can be an oxide layer of zinc oxide alone, or a layer including zinc oxide containing at least one element selected from tin, aluminum, chromium, titanium, silicon, boron, magnesium, indium and gallium, as a main component, and the layer including indium oxide as a main component can be a layer including indium oxide containing tin, as a main component.

Of those, a layer including zinc oxide, or zinc oxide containing at least one element selected from tin, aluminum, chromium, titanium, silicon, boron, magnesium, indium and gallium, particularly a layer including zinc oxide containing aluminum and/or titanium, as a main component is preferably used. Each oxide layer 43 may be a single layer and may be a multilayer.

The metal layer 44 includes silver as a main component. The metal layer 44 consists of silver or includes an alloy including silver as a main component. Constituent component other than silver in the metal layer 44 is palladium, gold, copper and the like, and the total content of constituent components other than silver is 0.3 atomic % or more and 10 atomic % or less.

The thickness of the oxide layer 43 and the metal layer 44 varies depending on the overall numbers of layers and the constituent materials of each layer. For example, each oxide layer 43 is 5 nm or more and 100 nm or less, each metal layer 44 is 5 nm or more and 20 nm or less, overall thickness of layers including all of the metal layer 43 and the metal layer 44 is 50 nm or more and 400 nm or less, and more preferably 150 nm or more and 300 nm or less.

The heat reflective coating 42 may include a high refractive index layer and a low refractive index layer in place of a layer including the oxide layer 43 and the metal layer 44. In general, the overall number of the high refractive index layer and the low refractive index layer is 3 or more, the thickness of the high refractive index layer is 70 nm or more and 150 nm or less, and the thickness of the low refractive index layer is 100 nm or more and 200 nm or less.

The high refractive index layer is, for example, a dielectric material having a refractive index (refractive index at a wavelength of 550 nm, hereinafter the same) of 1.9 or more, and preferably 1.9 or more and 2.5 or less. Specifically, the high refractive index layer includes layers including at least one selected from high refractive index materials such as tantalum oxide (refractive index: 2.0 to 2.2), titanium oxide (refractive index: 2.2 to 2.5), zirconium oxide (refractive index: 1.9 to 2.0) and hafnium oxide (refractive index: 1.95 to 2.15).

The low refractive index layer is, for example, a dielectric material having a refractive index of 1.5 or less, and preferably 1.2 or more and 1.5 or less. Specifically, the low refractive index layer includes layers including at least one selected from low refractive index materials such as silicon oxide (refractive index: 1.44 to 1.48) and magnesium fluoride (refractive index: 1.35 to 1.41).

The first glass substrate 2 and the second glass substrate 6 can be an organic transparent sheet such as a polycarbonate sheet or a polymethyl methacrylate sheet, as well as general inorganic transparent glass sheets.

The kind of the glass sheet is not always limited so long it is used as a glass sheet for vehicles. A float glass sheet formed by a float process is preferably used.

The thickness of the glass sheet can appropriately be selected, but is generally from about 1.8 to 2.5 mm. Coating for imparting water-repellent performance, hydrophilic performance, antifogging performance and the like may be applied to the glass sheet.

The laminated glass 1 of the present invention is applied to vehicles such as automobiles, railways, ships and the like, and particularly preferably applied to automobiles. The laminated glass 1 of the present invention is that generation of wrinkles, deformation and the like in the heat reflective film 4 is suppressed, and is therefore preferably used in those applications.

A method for manufacturing the laminated glass 1 of the present invention is described below.

The method for manufacturing a first laminated glass 1 of the present invention includes an intermediate production step of overlaying first and second PVB films on both surfaces of the heat reflective film 4, followed by heating and pressuring to thereby form an intermediate, and a pressing step of overlaying first and second glass substrates 2 and 6 on both surfaces of the intermediate, followed by heating and pressuring to thereby form the laminated glass 1.

A method for manufacturing a second laminated glass 1 of the present invention includes a lamination step of overlaying a first glass substrate 2, a first PVB film, a heat reflective film 4, a second PVB film and a second glass substrate 6 in this order to form an unpressed laminated glass, and a pressing step of heating and pressuring the unpressed laminated glass to form a laminated glass 1.

In the present invention, as in the first manufacturing method, an intermediate may be produced from the heat reflective film 4 and the first and second PVB films, and the first and second glass substrates 2 and 6 may be pressed to the intermediate to form the laminated glass 1. Furthermore, as in the second manufacturing method, all constituent materials of the laminated glass 1 may merely be overlaid to form an unpressed laminated glass, and the unpressed laminated glass may be pressed to form the laminated glass 1.

In any manufacturing method, a film including the resin film 41 having a thermal shrinkage in a maximum shrinkage direction of 0.5% or more and 3% or less and a thermal shrinkage in an orthogonal direction of 0.1% or more and 2% or less, and the heat reflective coating 42 formed thereon is used as the heat reflective film 4, and a film having a thermal shrinkage in a maximum shrinkage direction of 0.5% or more and 3% or less and a thermal shrinkage in an orthogonal direction of −2.5% or more and −0.5% or less is used as the first and second PVB films.

Furthermore, in any manufacturing method, when the heat reflective film 4 and the first and second PVB films are overlaid (an intermediate production step in the first manufacturing method, or a lamination step in the second manufacturing method), those are overlaid such that the maximum shrinkage direction of the resin film 41 is orthogonal to the maximum shrinkage direction of the first and second PVB films.

According to the manufacturing method of the present invention, the laminated glass 1 having suppressed generation of wrinkles, deformation and the like in the heat reflective film 4 can be manufactured by overlaying the resin film 41 and the PVB film, having thermal shrinkages in the maximum shrinkage direction and the orthogonal direction fallen within specific ranges such that the maximum shrinkage directions are orthogonal to each other.

The heat reflective film 4 and the PVB film, used in manufacturing the laminated glass 1 can use the films as described before. To overlay the heat reflective film 4 (resin film 41) and the PVB film such that the maximum shrinkage directions are orthogonal to each other in the intermediate production step in the first manufacturing method or the lamination step in the second manufacturing method, it can easily be conducted by that one film maintains a direction such as a film formation direction of the film discharged from a film forming machine in its state, other film turns for direction such that a direction such as a film formation direction of the film discharged from a film forming machine turns 90°, and those films are overlaid.

The intermediate production step in the first manufacturing method can produce the intermediate by heating and pressuring a laminate of the heat reflective film 41 and the first and second PVB films, for example, under the conditions of a temperature of from about 40 to 80° C. and a pressure of from about 0.1 to 1.0 MPa.

The pressing step in the first manufacturing method can produce the laminated glass 1 by placing a laminate of the intermediate and the first and second glass substrates 2 and 6 in a vacuum bag such as a rubber bag, and heating the laminate at from about 70 to 120° C. (more preferably from 70 to 110° C.) while deaerating such that a pressure becomes from about 1 to 100 kPa (more preferably from 1 to 36 kPa) to perform preliminary pressing, and heating and pressurizing the laminate in an autoclave at a temperature of from about 120 to 150° C. under a pressure of from about 0.98 to 1.47 MPa.

On the other hand, the pressing step in the second manufacturing method can produce the laminated glass 1 by similarly placing an unpressed laminated glass in a vacuum bag such as a rubber bag, and heating the unpressed laminated glass at from about 70 to 120° C. (more preferably from 70 to 110° C.) while deaerating such that a pressure becomes from about 1 to 100 kPa (more preferably from 1 to 36 kPa) to perform preliminary pressing, and heating and pressurizing the laminated glass in an autoclave at a temperature of from about 120 to 150° C. under a pressure of from about 0.98 to 1.47 MPa to perform main pressing.

EXAMPLES

The present invention is described in more detail below by reference to Examples.

Example 1

A film having thermal shrinkage in a maximum shrinkage direction (film formation direction (MD direction)) of 1.0% and thermal shrinkage in an orthogonal direction (direction orthogonal to the film formation direction (TD direction)) of 0.4% (manufactured by Toyobo Co., Ltd., trade name: A4100, thickness: 50 μm) was prepared as a PET film. The thermal shrinkage in the maximum shrinkage direction and the orthogonal direction of the PET film is an average value of the maximum shrinkage direction or the orthogonal direction of three PET films, obtained by the above measurement method.

Oxide layers and metal layers were alternately laminated in total of seven layers (oxide layer: 4 layers, and metal layer: 3 layers) on the PET film by a magnetron sputtering method described below to form a heat reflective coating, and a protective layer was further formed thereon to form a heat reflective film.

A first oxide layer having a thickness of 35 nm including oxides of zinc and titanium was formed on the PET film by conducting pulse sputtering of a frequency of 20 kHz, a power density of 3.8 W/cm$^2$ and a reverse pulse width of 5 μsec under a pressure of 0.1 Pa using a target prepared by sintering zinc oxide having added thereto 10 mass % of titanium oxide, while introducing a mixed gas prepared by mixing 5 vol % of oxygen gas with argon gas.

A first metal layer having a thickness of 10 nm including silver and gold was formed on the first oxide layer by conducting pulse sputtering of a frequency of 20 kKz, a power density of 2.5 W/cm$^2$ and a reverse pulse width of 5 μsec under a pressure of 0.1 Pa using a silver alloy target including silver having added thereto 0.25 mass % of gold, as a main component, while introducing argon gas.

A second oxide layer having a thickness of 70 nm including oxides of zinc and titanium was formed on the first layer by conducting pulse sputtering of a frequency of 20 kHz, a power density of 3.8 W/cm$^2$ and a reverse pulse width of 5 μsec under a pressure of 0.1 Pa using a target prepared by sintering zinc oxide having added thereto 10 mass % of titanium oxide, while introducing a mixed gas prepared by mixing 5 vol % of oxygen gas with argon gas.

A second metal layer having a thickness of 12 nm including silver and gold was formed on the second oxide layer by conducting pulse sputtering of a frequency of 20 kKz, a power density of 2.5 W/cm$^2$ and a reverse pulse width of 5 μsec under a pressure of 0.1 Pa using a silver alloy target including silver having added thereto 0.25 mass % of gold, as a main component, while introducing argon gas.

A third oxide layer having a thickness of 70 nm including oxides of zinc and titanium was formed on the second metal layer by conducting pulse sputtering of a frequency of 20 kHz, a power density of 3.8 W/cm$^2$ and a reverse pulse width of 5 μsec under a pressure of 0.1 Pa using a target prepared by sintering zinc oxide having added thereto 10 mass % of titanium oxide, while introducing a mixed gas prepared by mixing 5 vol % of oxygen gas with argon gas.

A third metal layer having a thickness of 10 nm including silver and gold was formed on the third oxide layer by conducting pulse sputtering of a frequency of 20 kKz, a power density of 2.5 W/cm² and a reverse pulse width of 5 μsec under a pressure of 0.1 Pa using a silver alloy target including silver having added thereto 0.25 mass % of gold, as a main component, while introducing argon gas.

A fourth oxide layer having a thickness of 35 nm including oxides of zinc and titanium was formed on the third metal layer by conducting pulse sputtering of a frequency of 20 kHz, a power density of 3.8 W/cm² and a reverse pulse width of 5 μsec under a pressure of 0.1 Pa using a target prepared by sintering zinc oxide having added thereto 10 mass % of titanium oxide, while introducing a mixed gas prepared by mixing 5 vol % of oxygen gas with argon gas.

A protective having a thickness of 5 nm was formed on the fourth oxide layer by conducting pulse sputtering of a frequency of 20 kHz, a power density of 2.5 W/cm² and a reverse pulse width of 5 μsec under a pressure of 0.1 Pa using an oxide target of gallium, indium and tin (manufactured by AGC ceramics Co., Ltd., trade name: GIT Target), while introducing a mixed gas prepared by mixing 5 vol % of oxygen gas with argon gas. Thus, a heat reflective film was obtained.

A first glass substrate, a first PVB film, the heat reflective film, a second PVB film and a second glass substrate were overlaid in this order such that the maximum shrinkage direction of the PET film is orthogonal to the maximum shrinkage directions of the first and second PVB films (that is, the maximum shrinkage direction of the first PVB film is parallel to the maximum shrinkage direction of the second PVB film), and the edge was temporarily joined to form an unpressed laminated glass.

The first and second PVB films were a PVB film having a thickness of 0.78 mm, a thermal shrinkage in a maximum shrinkage direction (film formation direction (MD direction)) of 2.2%, and a thermal shrinkage of −1.2% in an orthogonal direction (direction orthogonal to the film formation direction (TD direction)) (manufactured by Sekisui Chemical Co., Ltd.).

The thermal shrinkages in the maximum shrinkage direction and the orthogonal direction of the PVB film were an average value of the maximum shrinkage direction or the orthogonal direction of three PVB films, obtained by the above measurement method.

The unpressed laminated glass was placed in a vacuum bag, deaeration was conducted such that indication of a pressure gage becomes 100 kPa or less, and heating was conducted at 120° C. to conduct preliminary pressing. Furthermore, heating and pressuring were conducted at a temperature of 135° C. under a pressure of 1.3 MPa for 60 minutes by an autoclave, followed by final cooling. Thus, a laminated glass was obtained.

Comparative Example 1

A laminated glass was manufactured in the same manner as in Example 1, except that in producing the unpressed laminated glass, the PET film and the first and second PVB films were overlaid such that the maximum shrinkage direction of the PET film is parallel to the maximum shrinkage directions of the first and second PVB films.

Comparative Example 2

A laminated glass was manufactured in the same manner as in Example 1, except that a PET film having thermal shrinkage in a maximum shrinkage direction (film formation direction (MD direction)) of 4.6% and a thermal shrinkage in an orthogonal direction (direction orthogonal to the film formation direction (TD direction)) of 3.0% (manufactured by Toyobo Co., Ltd., trade name: SOFTSHINE, thickness: 50 μm) was used as the PET film, and in producing the unpressed laminated glass, the PET film and the first and second PVB films were arranged such that the maximum shrinkage direction of the PET film is parallel to the maximum shrinkage directions of the first and second PVB films.

Comparative Example 3

A laminated glass was manufactured in the same manner as in Example 1, except that a PET film having thermal shrinkage in a maximum shrinkage direction (film formation direction (MD direction)) of 4.6% and thermal shrinkage in an orthogonal direction (direction orthogonal to the film formation direction (TD direction)) of 3.0% (manufactured by Toyobo Co., Ltd., trade name: SOFTSHINE, thickness: 50 μm) was used as the PET film.

Regarding the laminated glasses of Example 1 and Comparative Examples 1 to 3, the presence or absence of wrinkles and deformation in the heat reflective film was observed. Regarding wrinkles, an area of 100 mm square was observed. Regarding deformation, a laminated glass in which contour of a heat reflective film deformed so as to shrink to contours of first and second glass substrates was considered that deformation is present.

The laminated glasses of Example 1 and Comparative Examples 1 to 3 were subjected to high temperature and high humidity test in which the laminated glass is introduced in a high temperature-high humidity chamber of 80° C. and relative humidity of 95% for 500 hours, and the presence or absence of cracks in a heat reflective film was observed by an optical microscope. The results are shown in Table 1.

TABLE 1

| | | PET film | | | PVB film | | | | | |
|---|---|---|---|---|---|---|---|---|---|---|
| | | Thermal shrinkage (%) | | Thickness | Thermal shrinkage (%) | | PET film/ | | | |
| | Trade name | MD | TD | (μm) | MD | TD | PVB film | Wrinkle | Deformation | Crack |
| Example 1 | A4100 | 1.0 | 0.4 | 50 | 2.2 | −1.2 | MD⊥MD | None | None | None |
| Comparative Example 1 | | 1.0 | 0.4 | 50 | 2.2 | −1.2 | MD//MD | Presence | Presence | None |
| Comparative Example 2 | SOFTSHINE | 4.6 | 3.0 | 50 | 2.2 | −1.2 | MD//MD | Presence | Presence | Presence |
| Comparative Example 3 | | 4.6 | 3.0 | 50 | 2.2 | −1.2 | MD⊥MD | Presence | None | Presence |

As is apparent from Table 1, regarding the laminated glass of Example 1 in which the PET film and the PVB film, having given thermal shrinkages were arranged such that the respective maximum shrinkage directions are orthogonal to each other, it was recognized that generation of wrinkles and deformation in the heat reflective film is suppressed and generation of cracks by a high temperature and high humidity test is also suppressed.

On the other hand, regarding the laminated glass of Comparative Example 1 in which the PET film and the PVB film, having given thermal shrinkages were used, but those films were arranged such that the respective maximum shrinkage directions are parallel to each other, it was recognized that wrinkles are generated on the entire surface of the heat reflective film, and it was also further recognized that the heat reflective film deforms so as to shrink in nearly rhombic shape.

Regarding the laminated glasses of Comparative Examples 2 and 3, in which a PET film having excessively large thermal shrinkage was used, generation of wrinkles and cracks due to the high temperature and high humidity test was recognized. In particular, regarding the laminated glass of Comparative Example 2, in which the maximum shrinkage directions of the PET film and the PVB film are parallel to each other, it was recognized that the heat reflective film deforms so as to shrink in nearly rhombic shape.

Although the present invention has been described in detail and by reference to the specific embodiments, it is apparent to one skilled in the art that various modifications or changes can be made without departing the spirit and scope of the present invention.

This application is based on Japanese Patent Application No. 2009-292007 filed on Dec. 24, 2009, the disclosure of which is incorporated herein by reference.

Industrial Applicability

According to the laminated glass of the present invention, generation of wrinkles, deformation and the like in a heat reflective film can be suppressed by arranging a resin film and a polyvinyl butyral film, having maximum shrinkages in a direction that a thermal shrinkage becomes maximum and in a direction orthogonal to the direction, falling within specific ranges such that the directions that the respective thermal shrinkages become maximum are orthogonal to each other.

DESCRIPTION OF REFERENCE NUMERALS AND SIGNS

| | |
|---|---|
| 1: | Laminated glass |
| 2: | First glass substrate |
| 3: | First adhesive layer |
| 4: | Heat reflective film |
| 5: | Second adhesive layer |
| 6: | Second glass substrate |
| 41: | Resin film |
| 42: | Heat reflective coating |
| 43: | Oxide layer |
| 44: | Metal layer |

The invention claimed is:

1. A laminated glass comprising a first glass substrate, a first adhesive layer, a heat reflective film, a second adhesive layer and a second glass substrate, laminated in this order,
wherein the heat reflective film comprises a resin film having a thermal shrinkage in a direction that a thermal shrinkage becomes maximum, of 0.5% or more and 3% or less and a thermal shrinkage in a direction orthogonal to the direction of 0.1% or more and 2% or less, and a heat reflective coating formed on the resin film;
the first adhesive layer and the second adhesive layer comprise a polyvinyl butyral film having a thermal shrinkage in a direction that a thermal shrinkage becomes maximum, of 0.5% or more and 3% or less and a thermal shrinkage in a direction orthogonal to the direction of −2.5% or more and −0.5% or less; and
the direction that a thermal shrinkage becomes maximum, of the resin film and the direction that a thermal shrinkage becomes maximum, of the polyvinyl butyral film are orthogonal to each other;
provided that the thermal shrinkage of the resin film is a thermal shrinkage when the resin film is maintained at 150° C. for 30 minutes, and the thermal shrinkage of the polyvinyl butyral film is a thermal shrinkage when the polyvinyl butyral film is maintained at 60° C. for 30 minutes.

2. The laminated glass according to claim 1, wherein the resin film has a thickness of 5 μm or more and 200 μm or less.

3. The laminated glass according to claim 1, wherein the resin film comprises polyethylene terephthalate.

4. The laminated glass according to claim 1, wherein the polyvinyl butyral film has a thickness of 50 μm or more and 1,000 μm or less.

5. A method for manufacturing a laminated glass, the method comprising:
an intermediate production step of overlaying first and second polyvinyl butyral films on both surfaces of a heat reflective film, followed by heating and pressuring, thereby obtaining an intermediate; and
a pressing step of overlaying first and second glass substrates on both surfaces of the intermediate, followed by heating and pressuring, thereby obtaining a laminated glass,
wherein the heat reflective film comprises a resin film having a thermal shrinkage in a direction that a thermal shrinkage becomes maximum, of 0.5% or more and 3% or less and a thermal shrinkage in a direction orthogonal to the direction of 0.1% or more and 2% or less, and a heat reflective coating formed on the resin film;
the first and second polyvinyl butyral films have a thermal shrinkage in a direction that a thermal shrinkage becomes maximum, of 0.5% or more and 3% or less and a thermal shrinkage in a direction orthogonal to the direction of −2.5% or more and −0.5% or less; and
in the intermediate production step, the heat reflective film and the first and second polyvinyl butyral films are overlaid such that the direction that a thermal shrinkage becomes maximum, of the resin film and the direction that a thermal shrinkage becomes maximum, of the first and second polyvinyl butyral films are orthogonal to each other;
provided that the thermal shrinkage of the resin film is a thermal shrinkage when the resin film is maintained at 150° C. for 30 minutes, and the thermal shrinkage of the polyvinyl butyral film is a thermal shrinkage when the polyvinyl butyral film is maintained at 60° C. for 30 minutes.

6. The method for manufacturing a laminated glass according to claim 5, wherein the heating and pressuring in the intermediate production step are conducted under conditions of temperature: 40 to 80° C. and pressure: 0.1 to 1.0 MPa.

7. The method for manufacturing a laminated glass according to claim 5, wherein the heating and pressuring in the pressing step are conducted under conditions of temperature: 120 to 150° C. and pressure: 0.98 to 1.47 MPa.

8. The method for manufacturing a laminated glass according to claim 5, wherein in the pressing step, the heating and pressuring are conducted after preliminary pressing of heating to 70 to 120° C. while deaerating so as to achieve pressure: 1 to 100 kPa.

9. A method for manufacturing a laminated glass, the method comprising:
- a lamination step of overlaying a first glass substrate, a first polyvinyl butyral film, a heat reflective film, a second polyvinyl butyral film and a second glass substrate in this order to obtain an unpressed laminated glass; and
- a pressing step of heating and pressuring the unpressed laminated glass to obtain a laminated glass;
- wherein the heat reflective film comprises a resin film having a thermal shrinkage in a direction that a thermal shrinkage becomes maximum, of 0.5% or more and 3% or less and a thermal shrinkage in a direction orthogonal to the direction of 0.1% or more and 2% or less, and a heat reflective coating formed on the resin film;
- the first and second polyvinyl butyral films have a thermal shrinkage in a direction that a thermal shrinkage becomes maximum, of 0.5% or more and 3% or less and a thermal shrinkage in a direction orthogonal to the direction of −2.5% or more and −0.5% or less; and
- in the lamination step, the heat reflective film and the first and second polyvinyl butyral films are overlaid such that the direction that a thermal shrinkage becomes maximum, of the resin film and the direction that a thermal shrinkage becomes maximum, of the first and second polyvinyl butyral films are orthogonal to each other;
- provided that the thermal shrinkage of the resin film is a thermal shrinkage when the resin film is maintained at 150° C. for 30 minutes, and the thermal shrinkage of the polyvinyl butyral film is a thermal shrinkage when the polyvinyl butyral film is maintained at 60° C. for 30 minutes.

10. The method for manufacturing a laminated glass according to claim 9, wherein the heating and pressuring in the pressing step are conducted under conditions of temperature: 120 to 150° C. and pressure: 0.98 to 1.47 MPa.

11. The method for manufacturing a laminated glass according to claim 9, wherein in the pressing step, the heating and pressuring are conducted after preliminary pressing of heating to 70 to 120° C. while deaerating so as to achieve pressure: 1 to 100 kPa.

* * * * *